United States Patent
Stamps et al.

(10) Patent No.: US 9,765,825 B2
(45) Date of Patent: Sep. 19, 2017

(54) ROTOR HUB DAMPER FOR A ROTORCRAFT

(71) Applicant: Bell Helicopter Textron Inc., Fort Worth, TX (US)

(72) Inventors: Frank B. Stamps, Colleyville, TX (US); Daniel P. Sottiaux, Flower Mound, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 206 days.

(21) Appl. No.: 14/135,670

(22) Filed: Dec. 20, 2013

(65) Prior Publication Data
US 2015/0176658 A1 Jun. 25, 2015

(51) Int. Cl.
| | | |
|---|---|---|
| *B60G 15/06* | (2006.01) | |
| *F16D 3/80* | (2006.01) | |
| *B64C 27/51* | (2006.01) | |
| *F16F 13/14* | (2006.01) | |
| *F16F 1/32* | (2006.01) | |
| *B64D 35/04* | (2006.01) | |
| *B64C 27/39* | (2006.01) | |
| *F16F 9/20* | (2006.01) | |
| *F16F 13/06* | (2006.01) | |

(52) U.S. Cl.
CPC ............. *F16D 3/80* (2013.01); *B60G 15/066* (2013.01); *B64C 27/39* (2013.01); *B64C 27/51* (2013.01); *B64D 35/04* (2013.01); *F16F 1/32* (2013.01); *F16F 13/14* (2013.01); *B60G 15/061* (2013.01); *F16F 9/20* (2013.01); *F16F 13/06* (2013.01)

(58) Field of Classification Search
CPC .... F16F 13/06; F16F 13/24; F16F 1/32; F16F 9/20; F16D 3/80; B64D 35/04; B60G 15/066; B60G 15/061
USPC ... 267/217, 219, 104.11, 136, 195, 201, 226
See application file for complete search history.

(56) References Cited

U.S. PATENT DOCUMENTS

| | | | | |
|---|---|---|---|---|
| 3,345,019 A | * | 10/1967 | Black .................. | B64C 25/62 244/100 R |
| 3,409,285 A | * | 11/1968 | Maennig ............... | B60G 11/48 267/217 |
| 5,004,215 A | * | 4/1991 | Aubry et al. ........... | 267/140.13 |
| 5,501,434 A | * | 3/1996 | McGuire ............... | 267/140.11 |
| 6,092,795 A | * | 7/2000 | McGuire ............... | F16F 9/43 188/322.21 |
| 6,676,074 B2 | * | 1/2004 | Zoppitelli ............. | B64C 27/35 244/17.11 |

(Continued)

FOREIGN PATENT DOCUMENTS

| | | |
|---|---|---|
| DE | 102007020137 A1 | 5/2008 |
| EP | 2098449 A1 | 9/2009 |

(Continued)

OTHER PUBLICATIONS

European Search Report in related European Patent Application 14176755.8, dated Jan. 7, 2015, 3 pages.

(Continued)

*Primary Examiner* — Thomas Irvin
(74) *Attorney, Agent, or Firm* — Lightfoot & Alford PLLC (57) ABSTRACT

A damper for a rotor hub for a rotorcraft can include a housing, a piston resiliently coupled to the housing with a first elastomeric member and a second elastomeric member, a plurality of conical members, a fluid, and an orifice.

16 Claims, 6 Drawing Sheets

(56) References Cited

U.S. PATENT DOCUMENTS

| | | | |
|---|---|---|---|
| 8,622,375 B2* | 1/2014 | Bosworth | B64C 27/51 |
| | | | 267/140.11 |
| 8,632,308 B2* | 1/2014 | Russell | B64C 27/35 |
| | | | 416/145 |
| 8,763,997 B2* | 7/2014 | Dunn | B64C 25/52 |
| | | | 244/100 R |
| 9,086,113 B2* | 7/2015 | Bonnet | B64D 27/26 |
| 9,188,190 B2* | 11/2015 | Bosworth | F16F 9/52 |
| 9,321,527 B2* | 4/2016 | Louis | B64C 27/51 |
| 9,353,820 B2* | 5/2016 | Schofield | B64C 27/51 |
| 9,457,898 B2* | 10/2016 | Russell | B64C 27/51 |
| 2010/0247288 A1* | 9/2010 | Russell | 415/1 |
| 2011/0133378 A1* | 6/2011 | Dunn | 267/217 |
| 2011/0148015 A1* | 6/2011 | Hodgson | 267/136 |
| 2012/0051909 A1* | 3/2012 | McGuire | 416/1 |
| 2012/0141276 A1* | 6/2012 | Fuhrer et al. | 416/140 |
| 2013/0241124 A1 | 9/2013 | Bosworth | |

FOREIGN PATENT DOCUMENTS

| | | | |
|---|---|---|---|
| GB | 2381846 A | 5/2003 | |
| JP | H08121528 A | 5/1996 | |

OTHER PUBLICATIONS

European Examination in related European Patent Application 14176755.8, dated Feb. 9, 2015, 6 pages.
Notice of Requisition in related Canadian Patent Application 2,863,707, dated Oct. 2, 2015, 4 pages.
Notice of Allowance in related European Patent Application 14176755.8, dated Jun. 11, 2015, 26 pages.
Notice of Requisition in related Canadian Patent Application No. 2,863,707, dated Jul. 18, 2016, 6 pages.

* cited by examiner

ROTOR HUB DAMPER FOR A ROTORCRAFT

BACKGROUND

Technical Field:

The system of the present application relates to a damper for an aircraft. In particular, the system of the present application relates to a lead/lag damper for a rotorcraft. The damper is particularly well suited for use in the field of rotary wing aircraft; however, other types of aircraft can implement the damper as well. It should be appreciated that even though the damper is illustrated herein with regard to an aircraft, one ordinary skill in the art with benefit of this disclosure will recognize that the damper can be implemented in applications other than an aircraft.

Description of Related Art:

Certain conventional rotorcraft can have multi-bladed rotor hub configurations that require lead/lag dampers to compensate for the acceleration and deceleration of each rotor blade about a rotor blade hinge axis. During forward flight of the rotorcraft, unequal drag forces on the advancing and retreating rotor blade positions typically cause oscillating forces that if left untreated, can negatively affect the rotorcraft. For example, untreated lead/lag oscillating forces can severely limit the life of structural components through fatigue. Furthermore, untreated lead/lag oscillating forces have been known to cause catastrophic results in a "ground resonance" phenomenon in which the oscillation frequency is similar to the resonant frequency of the aircraft on its landing gear.

Conventionally, lead/lag dampers utilize only elastomeric material to provide the spring rate; however, the spring rate of the elastomeric material tends to stiffen at low temperatures and soften at high temperatures. There is a need for an improved lead/lag damper that provides a more constant spring rate at extreme temperatures.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
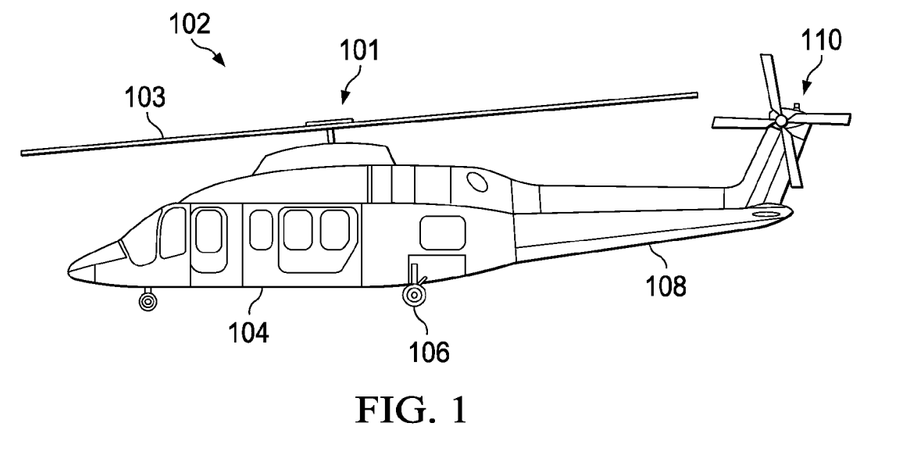
FIG. 1 is a side view of a rotorcraft in helicopter mode, according to an example embodiment.

Referring to FIG. 1 in the drawings, a rotorcraft 102 is illustrated. Rotorcraft 102 has a main rotor system 101 with a plurality of rotor blades 103. Rotorcraft 102 further includes a fuselage 104, landing gear 106, and an empennage 108. A main rotor control system can be used to selectively control the pitch of each rotor blade 103 in order to selectively control direction, thrust, and lift of rotorcraft 101. Rotorcraft 102 can also include a tail rotor system 110 for providing anti-torque and directional control. It should be appreciated that even though the present disclosure is depicted with regard to a rotorcraft 102 having certain illustrated features, it should be appreciated that the embodiments disclosed herein can be implemented on other rotorcraft and rotorcraft configurations, as one of ordinary skill in the art would fully appreciate having the benefit of this disclosure.

Figure 2:
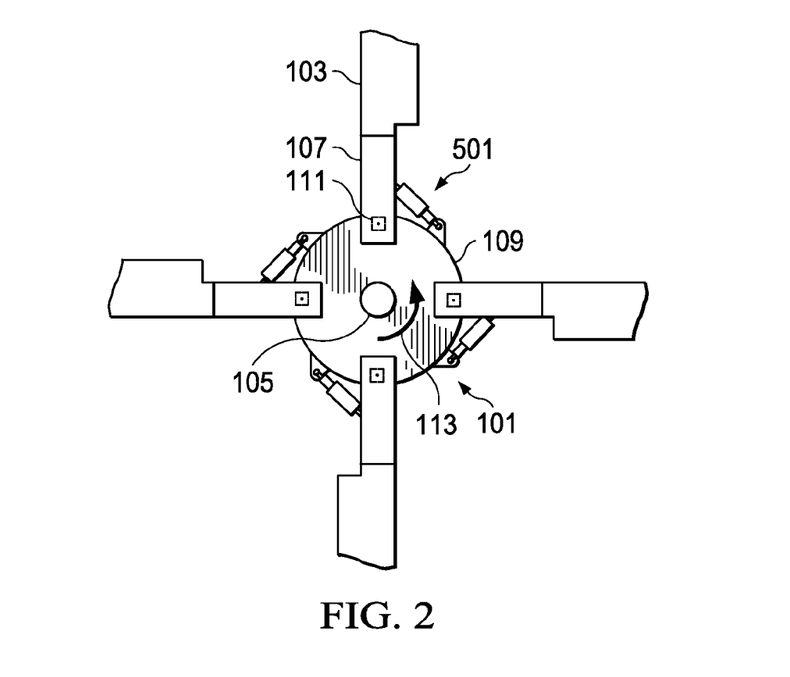
FIG. 2 is a top schematic view of a rotor hub, according to an example embodiment.

Referring to FIG. 2, a rotor hub 101 of rotorcraft 102 includes a plurality of rotor blades 103 coupled to a central yoke 109, via a rotor grip 107. Yoke 109 is coupled to a rotor mast 105 such that rotation of rotor mast 105, in a direction 113, causes the yoke 109 and rotor blades 103 to rotate about the rotor mast axis of rotation. Each rotor blade 103 can be hinged about a hinge axis 111. Hinge axis 111 can be the result of a discreet hinge, or alternatively from a virtual hinge, or combination thereof. A damper 501 is coupled between each rotor blade 103 and the rotor yoke 109. Damper 501 is configured to dampen lead/lag oscillations during operation of the rotorcraft, as further described herein. It should be appreciated that the even though rotor hub 101 is illustrated with four rotor blades 103, the embodiments of the present disclosure are equally applicable to rotor hubs having an alternative number of rotor blades 103. Further, it should be appreciated that even though damper 501 particularly well suited for a main rotor hub, as illustrated, damper 501 may also be utilized on a tail rotor hub, such as in tail rotor system 110 (illustrated in FIG. 1).

Figure 3:
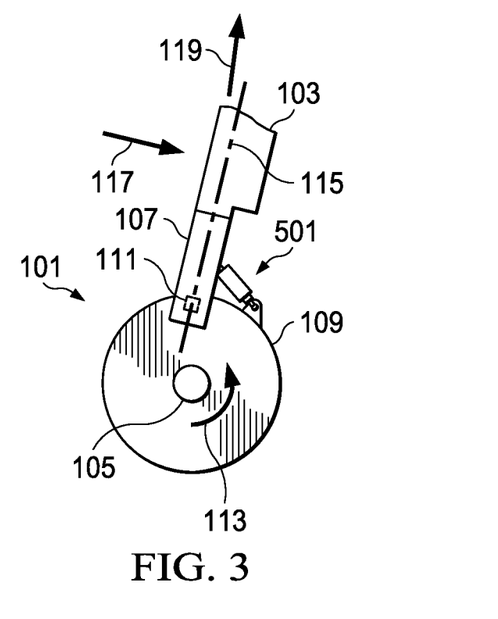
FIG. 3 is a top partial perspective view of a rotor hub, according to an example embodiment.

Referring now to FIG. 3, rotor hub 101 is further illustrated. For clarity, only a single rotor blade 103 is shown; however, it should be appreciated that the disclosure regarding to the rotor blade 103 is equally applicable to other rotor blades 103 that are not shown for clarity. During operation of the rotorcraft, rotor hub 101 is subjected to a variety of aerodynamic forces, as well as mechanical dynamic forces. Rotor hub 101 can rotate around the rotor mast axis at approximately 300-350 revolutions per minute (RPM). However, it should be appreciated that the rate of rotation of rotor hub 101 is implementation specific; accordingly, the present disclosure contemplates rotor hubs that rotate at other RPM's as well.

A centrifugal force 119 acts upon rotor blade 103 when rotor blade 103 is rotating around the rotor mast axis. Further, an aerodynamic drag force 117 imparts a restraining force upon the rotor blade 103. The centrifugal force 119 and aerodynamic drag force 117 create moments that act upon rotor blade 103. The damper 501 also creates a moment acting on the rotor blade 103. When the moments from the centrifugal force 119, the damper 501 and aerodynamic drag force 117 are balanced, then the rotor blade 103 is an equilibrium position, such as equilibrium position 115. However, when the centrifugal force 119, damper force 501 and aerodynamic drag force 117 change during operation of the rotorcraft, then a relatively steady force acts on rotor blade 103 until the relatively steady force repositions rotor blade 103 into a new equilibrium position.

Figure 4A:
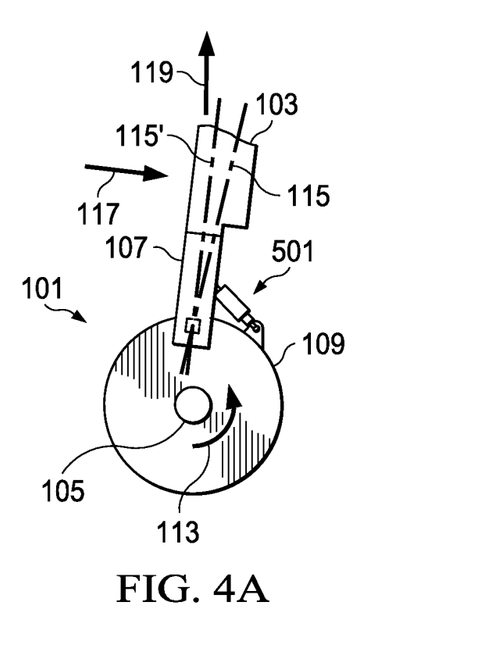
FIG. 4A is a top partial perspective view of a rotor hub, according to an example embodiment.
Figure 4B:
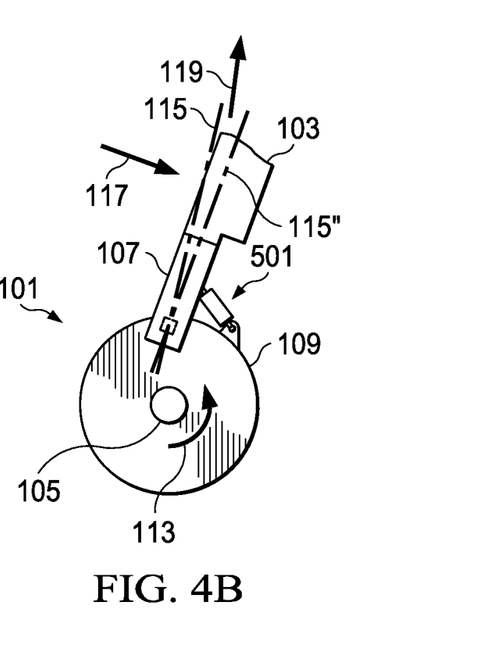
FIG. 4B is a top partial perspective view of a rotor hub, according to an example embodiment.

Referring also to FIG. 4A, rotor blade 103 is shown in a forward position 115' in which the position of rotor blade 103 has deviated forwardly from equilibrium position 115. Referring also to FIG. 4B, rotor blade 103 is shown in an aft position 115" in which the position of rotor blade 103 has deviated aft of equilibrium position 115. These deviations of rotor blade 103 into a forward position 115' or an aft position 115", can be the result of a lead/lag force that imparts an oscillatory force causing the temporary positioning of rotor blade 103 in forward position 115' or aft position 115". When airflow resulting from a translation of the rotorcraft, or a wind gust, aligns with a directional position of rotor blade 103, then the temporary decrease in drag and additional damper force act to accelerate the rotor blade 103 during that rotational phase of the rotor blade 103, resulting in the temporary forward position 115'. In contrast, when the translation airflow direction opposes the directional position of rotor blade 103, then the temporary increase in drag and additional damper force act to decelerate the rotor blade 103 during that rotation phase of the rotor blade 103, resulting in the temporary aft position 115". These lead/lag forces act to accelerate and decelerate each rotor blade 103 within a single revolution about the rotor mast 105. It is highly desirable to efficiently and effectively treat the lead/lag forces, as well as other oscillatory forces, with a damper.

Figure 5:
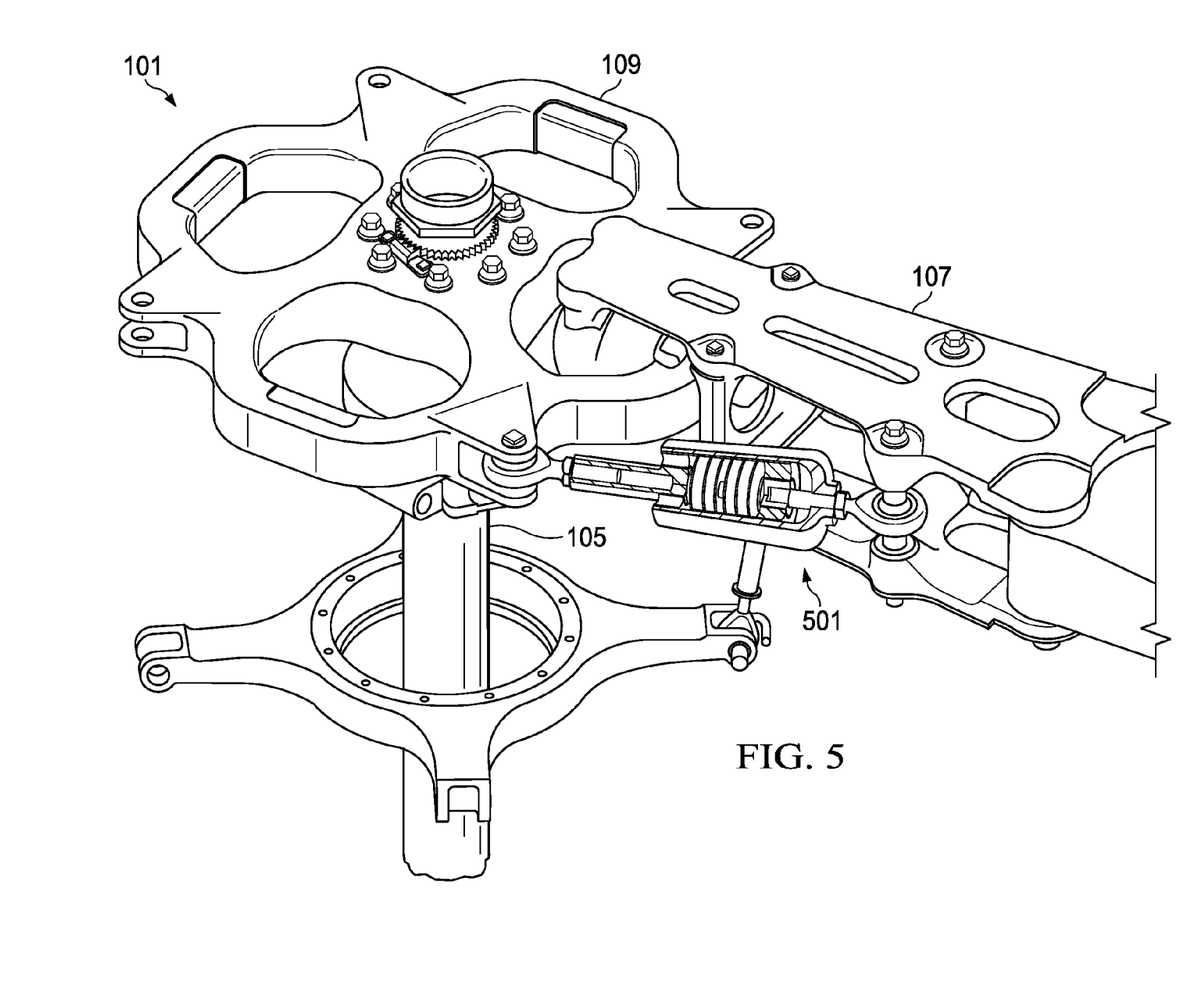
FIG. 5 is a perspective view of a rotor hub having a damper, according to an example embodiment.
Figure 6:
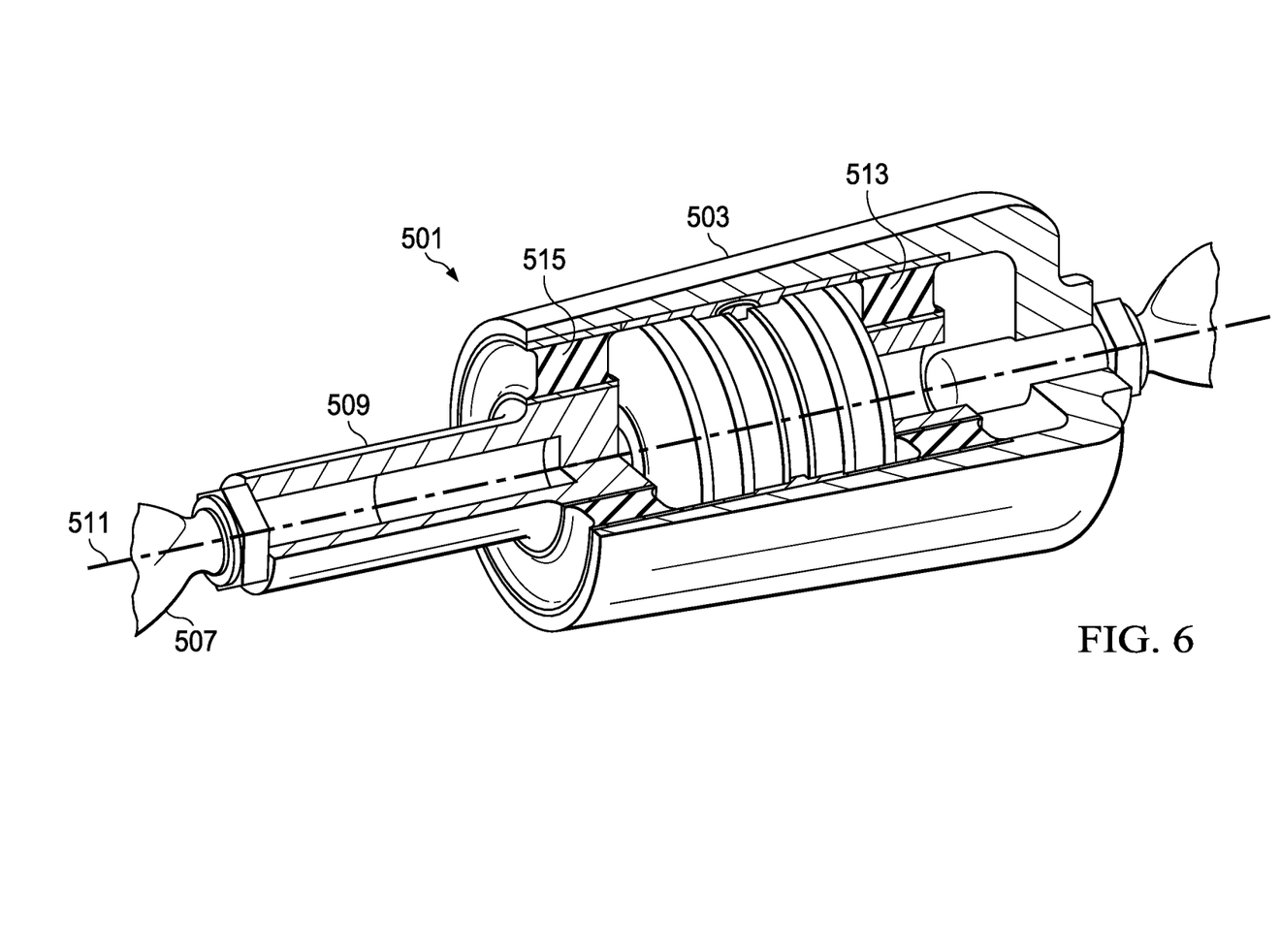
FIG. 6 is a partial cutaway perspective view of the damper, according to an example embodiment.
Figure 7:
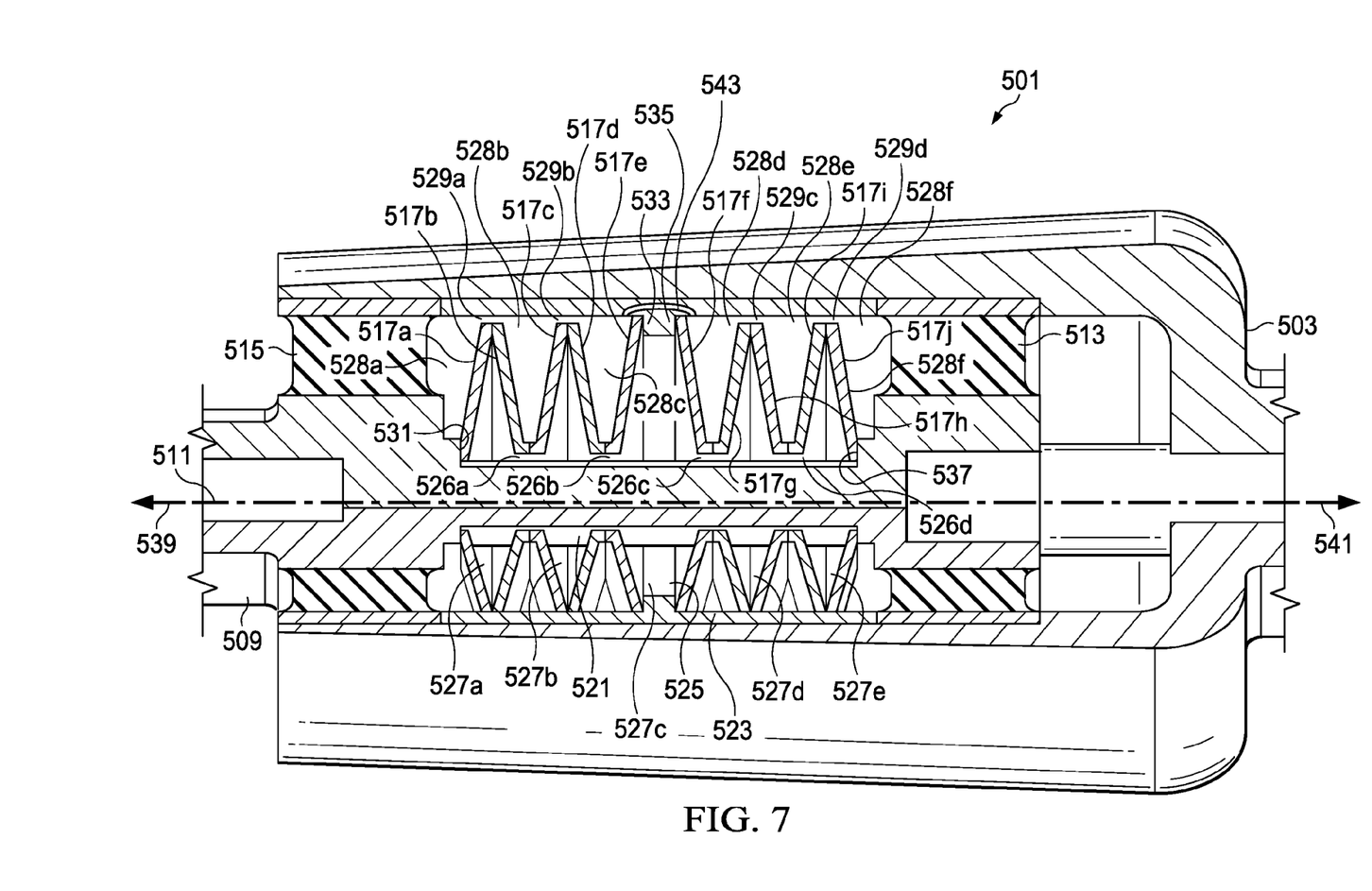
FIG. 7 is a partial cutaway perspective view of the damper, according to an example embodiment.

Referring now to FIGS. 5-7, damper 501 is illustrated in further detail. Damper 501 can include housing 503 rigidly coupled to a first attachment member 505. Damper 501 can also include a second attachment member 507 rigidly coupled to a piston 509. In illustrated embodiment, first attachment member 505 and second attachment member 507 are coupled to rotor grip 107 and yoke 109, respectively; however, it should be appreciated that damper 501 may be associated with the rotor hub 101 in a variety of configurations. Furthermore, damper 501 may alternatively be coupled between adjacent rotor blades 103, instead of being coupled between each rotor blade 103 and yoke 109. In the example embodiment, first and second attachment members 505 and 507 are rod ends each having an integral spherical bearing; however, it should be appreciated that first and second attachment members 505 and 507 may be of any configuration capable of providing a structural connection between rotor blade 103 and rotor yoke 109.

Housing 503 can include a hollow interior to which the operative components of damper 501 reside. Piston 509 extends along a central axis 511 within the hollow interior of housing 503. Piston 509 is resiliently coupled to an interior of housing 503 with a first elastomeric member 513 and a second elastomeric member 515. First elastomeric member 513 and second elastomeric member 515 include elastomeric material that has an implementation spring rate and damping rate. It should be appreciated that elastomeric members 513 and 515 may have a wide variety of configurations to tailor stiffness and damping properties of damper 501. In one example embodiment, elastomeric members 513 and 515 are each solid elastomeric members. In another example embodiment, elastomeric members 513 and 515 are each laminates of elastomeric layers with cylindrically shaped shims located therebetween. Further, the requisite length and thickness of elastomeric members 513 and 515 are implementation specific and depend in part on the predicted rotor hub dynamics and loading. Further, elastomeric members 513 and 513 provide only part of the total spring rate of damper 501, as discussed further herein.

Damper 501 also includes a plurality of conical members 517a-517j that are preferably metallic and deflect under a load along the central axis 511. The conical members 517a-517j have an implementation specific spring rate that can be dependent upon the material, size, geometry, and quantity thereof. The total spring rate of damper 501 is the combination of conical members 517a-517j and elastomeric members 513 and 515. One of advantage is that the spring rate provided by conical members 517a-517j doesn't vary at extreme temperatures as much as elastomeric material, thus the total spring rate doesn't vary as much as if the total spring rate was derived solely from elastomeric material.

Piston 509 has an elongated portion 521 that extends through an interior opening of each conical member 517a-517j. A sleeve 523 can be utilized adjacent to an interior of housing 503. In an alternative embodiment, sleeve 523 is integral with housing 503. A sealed fluid housing is formed by sleeve 523, first elastomeric member 513, second elastomeric member 515, and piston 509. The fluid housing is filled with a fluid 525 that is viscous and has the implementation specific viscosity characteristics to provide the desired damping. It should be appreciated a fluid accumulator, volume compensator, or the like, can be plumbed to fluid housing in order to maintain a desired pressure of fluid 525 within the fluid housing.

During operation, conical members 517a-517j not only provide spring rate during deflection, but also act to force fluid 525 back and forth through one or more orifices to provide damping as piston 521 oscillates along central axis 511 relative to housing 503. For example, orifices can be inner channels 526a-526d formed by the annular clearance between the inner portions of conical member 517b, 517c, 517d, 517e, 517f, 517g, 517h, and 517i and the outer surface of the elongated portion 521 of piston 509. Inner channels 526a-526d provide a damping fluid path between the inner chambers 527a-527e formed by adjacent oppositely oriented conical members 517a-517j. Further, orifices can be also outer channels 529a-529d that are formed by the annular clearance between the outer portions of conical members 517a-517d and 517f-517g-517j and the inner surface of sleeve 523 to provide a damping fluid path between outer chambers 528a-528c, as well as outer chambers 528d-528e.

A fluid path 543 can be utilized to provide fluid communication between outer chambers 528c and 528d. It should be appreciated that inner channels 526a-526d, outer channels 529a-529d, and fluid path 543 are merely exemplary of a variety orifices that can be implemented between conical members 517a-517j to generate damping.

In the example embodiment, adjacent conical members are oriented oppositely to each other. An inner portion of conical member 517a abuts to a shoulder 531 of piston 509 while an outer portion abuts to an outer portion of conical member 517b. An inner portion of conical member 517b abuts to an inner portion of conical member 517c. An outer portion of conical member 517c abuts to an outer portion of conical member 517d. An inner portion of conical member 517d abuts to an inner portion of conical member 517e. An outer portion of conical member 517e abuts to a shoulder 533 on sleeve 523. Conical members 517f-517j are oriented in a similar but opposition orientation to that of conical members 517a-517e. The outer portion of conical member 517f abuts to a shoulder 535 on sleeve 535. An inner portion of conical member 517j abuts to a shoulder 537 on piston 509. Fluid seals can be utilized between inner portion of conical member 517a and shoulder 531, between outer portion of conical member 517e and sleeve 523, between outer portion of conical member 517f and sleeve 523, and between inner portion of conical member 528f and shoulder 537.

During operation, piston 509 can oscillate relative to housing 503. One oscillatory component can be a translation of piston 509 in direction 539 relative to housing 503. Such a movement of piston 509 in direction 539 causes conical members 517f-517j to compress together resulting in a countering spring force, conical members 517a-517e to expand, and damping by fluid 525 being forced through any orifices between chambers 527a-527e and chambers 528a-528f. Similarly, the opposite oscillatory component can be a translation of piston 509 in direction 541 relative to housing. Such a movement of piston 509 in direction 541 causes conical members 517a-517e to compress together resulting in a countering spring force, conical members 517f-517j to expand, and damping by fluid 525 being forced through any orifices between chambers 527a-527e and chambers 528a-528f. Conical members 517a-517j are installed into damper 501 in pre-compression so that conical members 517a-517j remain in compression during operation.

One unique feature of the example embodiment is that inner chambers 527a-527e are fluidly connected together with inner channels 526a-526d to produce a primary damping rate as fluid is forced through inner channels 526a-526d at relatively high pressure. The outer chambers 528a-528f are fluidly connected together with outer channels 529a-529d and fluid path 543 to produce a secondary damping rate as fluid is forced through outer channels 529a-529d and fluid path 543 at a relatively low pressure. In the illustrated embodiment, inner chambers 527a-527e are pressurized with fluid 525 at a higher pressure than the pressurization of fluid 525 in outer chambers 528a-528f, thus the damper 501 can have desired damping characteristics at two different frequencies, which can be desirable in a rotor system, such a rotor system 101, that can have two different operational frequencies that need damping. Such a configuration can be particularly desirable for rotorcraft that fly in a multitude of flight regimes, such as variable rotor speed rotorcraft or tiltrotor aircraft, for example.

Another benefit of having inner chambers 527a-527e at high pressure and outer chambers 528a-528f at low pressure is that first elastomeric member 513 and second elastomeric member 515 are shielded from the high pressure environment which could otherwise have a negative impact on the life and reliability of first elastomeric member 513 and second elastomeric member 515.

In the example embodiment, if any of the fluid seals between inner portion of conical member 517a and shoulder 531, between outer portion of conical member 517e and sleeve 523, between outer portion of conical member 517f and sleeve 523, and between inner portion of conical member 528f and shoulder 537 were to fail, then the failsafe condition would be the equalization of the pressures in inner chambers 527a-527e with outer chambers 528a-528f such that the damper 501 continues to provide damping.

Figure 8:
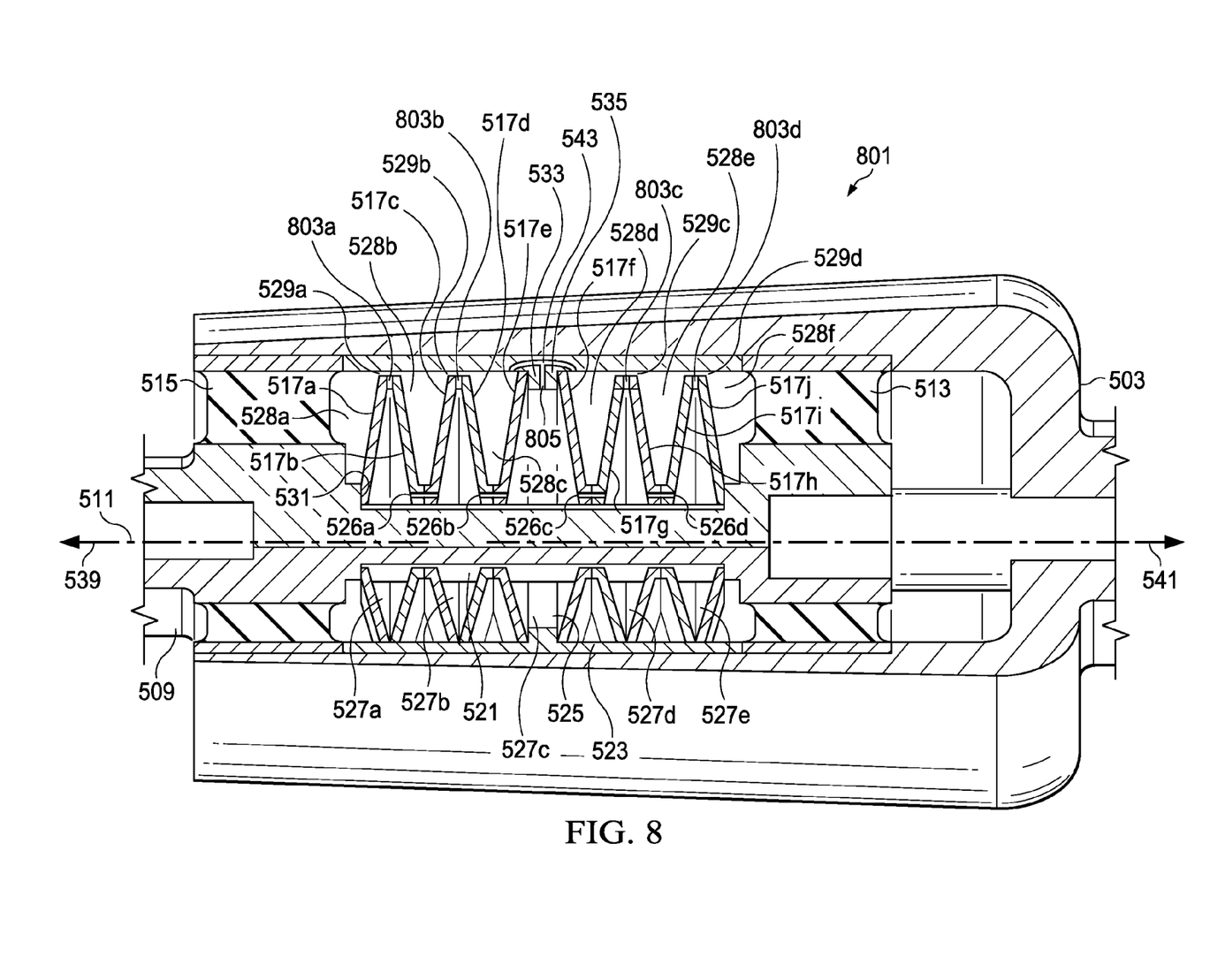
FIG. 8 is a partial cutaway perspective view of a damper, according to another example embodiment.

Referring now also to FIG. 8, an alternative embodiment damper 801 is illustrated. Damper 801 is substantially similar to damper 501, except for the features noted herein. Damper 801 includes additional fluid passages 803a-803d and 805 that fluidly connect the inner chambers 527a-527e and outer chambers 528a-528f. In one embodiment, the damper 501 basically has a single damping rate. In another embodiment, certain orifices or fluid passages 803a-803d, and 805 can be configured to hydrolock at certain frequencies or pressures, thus creating a multiple damping rates.

Dampers 501 and 801 include significant advantages over conventional dampers, such as: 1) having a spring rate that is partially attributed to conical members from a rigid material, such as metal, that has a relatively constant spring rate at extreme temperatures; and 2) utilizing the conical spring elements as pumping devices to force damping fluid through orifices associated with the conical spring elements, thereby having a more efficient damper.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A damper for a rotor hub for a rotorcraft, the damper comprising:
   a housing;
   a piston resiliently coupled to the housing with a first elastomeric member and a second elastomeric member;
   a plurality of conical members coupled between the housing and the piston in a compressive state, such that a relative motion between the piston and the housing causes the plurality of conical members to flex by a compressive load change, the compressive load change being produced by the relative motion between the piston and the housing;

a fluid; and an orifice;

wherein the first elastomeric member, the second elastomeric member, the piston, the housing, and the conical members form inner chambers between the conical members and the piston and outer chambers between the conical members and the housing, each of the inner chambers and outer chambers comprising an at least partially conical shape;

wherein flexure of the conical members pumps the fluid through the orifice;

wherein the inner chambers are located radially between the conical members and the piston; and wherein the inner chambers have a higher pressure of fluid than the outer chambers.

2. The damper according to claim 1, wherein the plurality of conical members are stacked in an alternating arrangement.

3. The damper according to claim 1, wherein the plurality of conical members include a first conical member having an inner portion abutted to a shoulder of the piston.

4. The damper according to claim 1, wherein the plurality of conical members include a second conical member having an outer portion abutted to a shoulder of the housing.

5. The damper according to claim 1, wherein the damper has a spring rate derived from the first elastomeric member, the second elastomeric member, and the plurality of conical members.

6. The damper according to claim 1, wherein the damper has a damping rate derived from at least the fluid being forced through the orifice during a translation of the piston relative to the housing.

7. The damper according to claim 1, wherein the plurality of conical members are metal.

8. The damper according to claim 1, wherein the rotor hub is a main rotor hub.

9. The damper according to claim 1, wherein the rotor hub is a tail rotor hub.

10. The damper according to claim 1, wherein the housing is coupled to a rotor grip of a rotor blade.

11. The damper according to claim 1, wherein the piston is coupled to a yoke of the rotor hub.

12. The damper according to claim 1, wherein the piston has an elongated portion that extends through an opening in each of the plurality of conical members.

13. The damper according to claim 12, wherein the orifice is an inner channel formed by a clearance between an inner portion of at least one of the plurality of conical members and the elongated portion of the piston.

14. The damper according to claim 1, wherein the orifice is an outer channel formed by a clearance between an outer portion of at least one of the plurality of conical members and the housing.

15. The damper according to claim 1, wherein the orifice includes a plurality of inner channels fluidly connecting the inner chambers, and include a plurality of outer channels fluidly connecting the outer chambers.

16. The damper according to claim 15, further comprising:

a plurality of fluid passages providing fluid communication between the outer chambers and the inner chambers.

* * * * *